US010790598B2

(12) United States Patent
Bürger

(10) Patent No.: US 10,790,598 B2
(45) Date of Patent: Sep. 29, 2020

(54) METHOD FOR PRODUCING A NUT WHICH IS ROTATIONALLY CONNECTED TO A CABLE SHOE, AND NUT WHICH IS ROTATIONALLY CONNECTED TO A CABLE SHOE

(71) Applicant: GUSTAV KLAUKE GMBH, Remscheid (DE)

(72) Inventor: Bernd Bürger, Remscheid (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 0 days.

(21) Appl. No.: 16/339,349

(22) PCT Filed: Oct. 5, 2017

(86) PCT No.: PCT/EP2017/075276
§ 371 (c)(1),
(2) Date: Apr. 3, 2019

(87) PCT Pub. No.: WO2018/065503
PCT Pub. Date: Apr. 12, 2018

(65) Prior Publication Data
US 2020/0052419 A1 Feb. 13, 2020

(30) Foreign Application Priority Data
Oct. 7, 2016 (DE) .................. 10 2016 119 053

(51) Int. Cl.
*F16B 37/06* (2006.01)
*H01R 4/30* (2006.01)
(Continued)

(52) U.S. Cl.
CPC .......... *H01R 4/302* (2013.01); *F16B 37/065* (2013.01); *F16B 41/002* (2013.01); *H01R 11/12* (2013.01); *H01R 11/26* (2013.01)

(58) Field of Classification Search
CPC ....... H01R 11/12; H01R 11/26; F16B 37/065; F16B 41/002
See application file for complete search history.

(56) References Cited

U.S. PATENT DOCUMENTS 1,112,525 A * 10/1914 Darling ................. F16M 11/04
248/187.1
1,872,385 A * 8/1932 Andren ................. B21D 39/03
411/180
(Continued)

FOREIGN PATENT DOCUMENTS

DE 200 01 463 U1 5/2000
DE 102 43 759 A1 3/2004
WO 2006/042812 A1 4/2006

OTHER PUBLICATIONS

International Search Report for corresponding international patent application No. PCT/EP2017/075276 dated Nov. 7, 2017, 4 pages.
(Continued)

*Primary Examiner* — Edwin A. Leon
*Assistant Examiner* — Milagros Jeancharles
(74) *Attorney, Agent, or Firm* — Klintworth & Rozenblat IP LLP

(57) ABSTRACT

The invention relates to a method for producing a nut which is rotationally connected to a flat part connecting section of a cable shoe, wherein the flat part connecting section has a passage opening, the nut has a sitting face which is at the bottom in the connected state, and a holder section extends on the nut from the sitting face further downward, wherein a tapered portion of the passage opening is formed by a holder material section which is preliminarily curved into the passage opening by deformation, and the holder material section is produced by a recess which is made in the flat part connecting section so as to surround the passage opening on a top side of the flat part connection section, which top side
(Continued)

is associated with the sitting face. In order to specify a method of this kind which can be carried out in respect of production, in particular in respect of the production costs, in a favourable manner, it is proposed that the holder material section is first formed and the nut is placed onto the top side, wherein the holder section protrudes downward beyond a narrowest cross section of the passage opening which is formed by the holder material section, and that the holder section is then widened below the narrowest cross section, for the purpose of holding the nut on the cable shoe in a rotatable and interlocking manner. The invention further relates to a nut which is fitted in a rotatable manner on a flat part connecting section of a cable shoe.

7 Claims, 4 Drawing Sheets

(51) Int. Cl.
*F16B 41/00* (2006.01)
*H01R 11/12* (2006.01)
*H01R 11/26* (2006.01)

(56) References Cited

U.S. PATENT DOCUMENTS

| | | | | |
|---|---|---|---|---|
| 6,979,160 | B2* | 12/2005 | Babej | B23P 19/062 29/432.2 |
| 7,160,047 | B2* | 1/2007 | Mueller | B23P 19/062 29/512 |
| 8,777,536 | B2* | 7/2014 | Frenken | H01R 4/30 411/180 |
| 9,849,549 | B2* | 12/2017 | Diehl | B23P 19/00 |
| 2001/0008817 | A1 | 7/2001 | Krause | |
| 2005/0158142 | A1* | 7/2005 | Babej | B23P 19/062 411/181 |
| 2006/0056937 | A1 | 3/2006 | Babej | |
| 2009/0162135 | A1 | 6/2009 | Frenken | |
| 2010/0209210 | A1* | 8/2010 | Kovac | F16B 27/00 411/172 |

OTHER PUBLICATIONS

Written Opinion for corresponding international patent application No. PCT/EP2017/075276 dated Nov. 7, 2017, 7 pages.

* cited by examiner

METHOD FOR PRODUCING A NUT WHICH IS ROTATIONALLY CONNECTED TO A CABLE SHOE, AND NUT WHICH IS ROTATIONALLY CONNECTED TO A CABLE SHOE

TECHNICAL FIELD

The invention initially pertains to a method for producing a nut that is connected to a flat part connecting section of a cable shoe in a freely rotatable manner, wherein the flat part connecting section has a passage opening, the nut has a seating face, which is at the bottom in the connected state, and a holder section extends further downward from the seating face on the nut, wherein a tapered portion of the passage opening is formed by a holder material section, which is pre-curved into the passage opening by deformation, and wherein the holder material section is formed by a recess, which is produced in the flat part connecting section so as to surround the passage opening on a top side of the flat part connecting section that is associated with the seating face.

The invention furthermore pertains to a nut that is attached to a flat part connecting section of a cable shoe in a freely rotatable manner, wherein the flat part connecting section has a passage opening, the nut has a seating face, which is at the bottom in the connected state, and a holder section extends further downward from the seating face, wherein a recess is produced in the flat part connecting section so as to surround the passage opening on a top side that is associated with the seating face of the nut, wherein a tapered portion of the passage opening is formed by a holder material section, which is pre-curved into the passage opening, and wherein the holder section protrudes downward beyond a narrowest cross section of the passage opening that is formed by the holder material section.

PRIOR ART

With respect to the prior art, we initially refer to WO 2006/042812 A1 (US 2009/0162135 A1). In the method known from this publication, the holder section of the nut is already provided with an undercut before the nut is attached to the top side of the flat part connecting section, wherein the production of the holder material section in the undercut of the holder section subsequently takes place simultaneously with the attachment of the nut, which is realized under the influence of a pressing force, such that the nut is rotatably and captively held on the cable shoe. However, this generally advantageous method proved costly with respect to the required special design of the nut with the undercut in the holder section. This at least applies if—only—required quantities with respect to a certain size of the cable shoe and/or the nut do not allow an economical production of a thusly designed nut.

Furthermore it is to refer to DE 200 01 463 U1. According to this publication, the holder section of the nut is not deformed in the sense of the aforementioned undercut by being widened until the nut is seated on the top side of the holder material section and the holder section accordingly extends into the passage opening. In order to allow this procedure, the passage opening of the flat part connecting section of the cable shoe known from this publication is realized in such a way that it conically widens in the inserting direction of the holder section between an initial cylindrical section and its end. Such a design of the opening of the holder material section is also comparatively expensive with respect to its production. In addition, the proposed angle of bevel of the conical widening also leads to a considerable surface loss on the bottom side of the flat part connecting section. This can affect the conductive connection between the cable shoe and a component to be connected to the cable shoe.

DE 10243759 A1 discloses the rotationally rigid connection of a fastening component to a sheet metal part, which may also be formed by the flat part connecting section of a cable shoe. For this purpose, a punched collar is formed on one side of the fastening component and a rivet section is formed on its other side, wherein said rivet section is pressed into the passage opening formed by the punched section in order to additionally widen this passage opening and at the same time deformed radially outward.

SUMMARY OF THE INVENTION

Based on the above-described prior art, the invention aims to disclose a nut that is rotationally connected to a flat part connecting section of a cable shoe, as well as a nut that is rotatably attached to a flat part connecting section of a cable shoe, wherein said method can be carried out in a favorable manner with respect to the production, particularly with respect to the production costs, and a corresponding nut, which is rotationally connected to the cable shoe, can at the same time be advantageously produced, preferably without limitation of its usability.

With respect to the method, this objective is attained with the object of claim 1, according to which it is proposed that the holder material section is initially formed and the nut is attached to the top side, wherein the holder section of the nut protrudes downward beyond a narrowest cross section of the passage opening, which is formed by the holder material section, and that the holder section is subsequently widened underneath the narrowest cross section in order to hold the nut on the cable shoe in a freely rotatable and interlocking manner.

With respect to the rotationally attached nut, the above-defined objective is attained with the object of claim 2 in that the holder section is widened underneath the narrowest cross section by plastic deformation in order to hold the nut on the cable shoe in a freely rotatable and interlocking manner.

The recess initially may be produced in a separate production process. This may be realized, e.g., by pressing a die with a contour corresponding to the desired recess into the top side of the flat part connecting section. Since cable shoes of this type usually are processed on a rotary table in order to carry out the required production steps, particularly the deformation steps, this production step can be advantageously integrated into the cycle sequence. It may even be integrated into another production step to be carried out.

In addition, the recess may also be produced by pressing the nut on the top side of the holder connecting section if a corresponding pre-curvature is already provided on the underside, i.e. on the seating face of the nut. With respect to the seating face, the nut may to this end be realized as described in greater detail in aforementioned publication WO 2006/042812 A1. With respect to the design of the nut on the seating face, the disclosure of this publication is hereby fully incorporated into the disclosure of the present application, namely also for the purpose of incorporating characteristic features disclosed in this publication into a claim of the present application.

The seating face of the nut refers to an underside of the nut that is in contact with the top side of the flat part connecting section radially inward starting from a radially outer surface, which in the attached state extends parallel to the top side of the flat part connecting section, or insofar would be in contact with the top side in a continuously planar design of the top side of the flat part connecting section and/or the bottom side of the nut.

In a design of the nut in accordance with aforementioned publication WO 2006/042812 A1, the rotationally connected nut can be radially held in the flat part connecting section of the cable shoe, particularly in a supplementary manner, by means of the seating face. In a design with a separately produced recess, in which the seating face of the nut does not engage into said recess, the nut is radially held in the region of the holder section.

The flat part connecting section of the cable shoe may be realized in different ways. The cable shoe initially may be formed of a tube, wherein the flat part connecting section is realized by pressing a tube section into a flat shape. Accordingly, two material layers lie on top of one another in the flat part connecting section, wherein the edges of said material layers are folded such that they transform into one another as long as no edge-trimming process is carried out. This makes it possible, in particular, to essentially limit the aforementioned recess to the location formed by the top side of the flat part connecting section facing the nut regardless of whether said recess is produced separately or by a formation of the seating face of the nut during an attachment of the nut to the flat part connecting section by means of a press.

The flat part connecting section may also be realized continuously integral with respect to its cross section if the cable shoe is insofar made of a solid material. In this case, the recess and the holder material section formed thereby may effectively also be shifted deeper into the passage opening in the direction of the side of the flat part connecting section lying opposite of the seating face of the nut. This may be particularly advantageous if the seating face of the nut has a design that simultaneously results in the aforementioned recess when the nut is pressed on the top side of the flat part connecting section.

Other characteristic features of the invention are described below, namely also in the description of the figures, and illustrated in the drawings, frequently in their preferred correlation with the already discussed claims, but these characteristic features may also be significant in correlation with only one or multiple individual characteristic features described or graphically illustrated herein or independently or in a different overall concept.

With respect to the method, it is furthermore preferred that the recess is initially produced in the flat part connecting section and the cable shoe is then subjected to a surface treatment, particularly an anti-corrosion treatment such as chromium plating or tin plating, before the nut is attached and the holder section is widened. In this way, a cable shoe that is subjected to an additional surface treatment step, particularly a corrosion-protected cable shoe, can be advantageously achieved despite a deformation process to be carried out on the cable shoe in order to form the holder material section. No additional deformation of the cable shoe is required after the application of the exemplary corrosion protection. The specially treated surface of the cable shoe cannot be affected by a deformation process to be carried out in order to hold the nut on the cable shoe.

The recess may be produced on the flat part connecting section of the cable shoe from the same side of the cable shoe as a potentially preceding deformation, particularly for producing the flat part connecting section on a tubular base part. This simplifies the aforementioned processing, e.g. on a rotary table or in another incremental deformation process.

The holder section is frequently widened in a separate production step, especially in consideration of the potential intermediate surface treatment, particularly an above-described anti-corrosion treatment of the cable shoe. In this case, the flat part connecting section is acted upon on the side lying opposite of the top side of the flat part connecting section, which is associated with the seating face of the screw. The widening may be advantageously realized, for example, with a conical mandrel. In this case, the side of the flat part connecting section lying opposite of the aforementioned top side can be advantageously used as a limit stop for the insertion depth of the mandrel.

The holder section preferably is only widened to such an extent that the desired interlock between the nut and the cable shoe is achieved. In other respects, however, an axial play should remain in order to allow the desired rotatability of the nut being held on the cable shoe in an interlocking manner.

In any case, it is preferred that the holder section only extends within a thickness of the holder connecting section after the holder section has been widened. In the connected state, the holder connecting section therefore can rest on a bearing surface with the side lying opposite of the top side in an unimpaired manner.

The passage opening itself may be realized in the form of a passage bore. The passage opening preferably can be punched out simultaneously with the production of the recess in accordance with the aforementioned integrated production steps. However, it may also be punched out in a separate step in the course of the production process.

In a cross section through the flat part connecting section, in which a geometric center axis of the passage opening forms a line, a partial region of the top side may on both sides protrude beyond the recess on the same side of the passage opening, particularly if said recess is produced in a separate production step and accordingly not with a formation on the seating face of the nut. In the aforementioned cross section, a bearing section of the top side, on which the seating face of the nut rests in the state of use, can thereby be formed to both sides of the recess. When the nut is screwed on and tightened, this can lead to a higher surface pressure than that of a nut, which rests on the top side of the flat part connecting section with its entire seating face. In any case, it is preferred that the recess is located within a surface that is defined by a projection of the seating face of the nut on the top side of the flat part connecting section in the direction of the geometric center axis. This projection refers to a concentric orientation of the nut and the passage opening. In the above-described cross section, the seating face of the nut preferably extends continuously linear and is interrupted by the screw opening of the nut with the internal thread.

The recess initially may be produced at only one location, multiple locations or a plurality of discrete locations of the circumference. It may be realized, e.g., in the form of a granular recess. The recess preferably is realized in the form of a circumferential groove, which particularly extends concentric to the center axis of the passage opening.

BRIEF DESCRIPTION OF THE DRAWINGS

The invention is described in greater detail below with reference to the attached drawings that, however, merely show exemplary embodiments. In these drawings.

DESCRIPTION OF THE EMBODIMENTS

Figure 1:
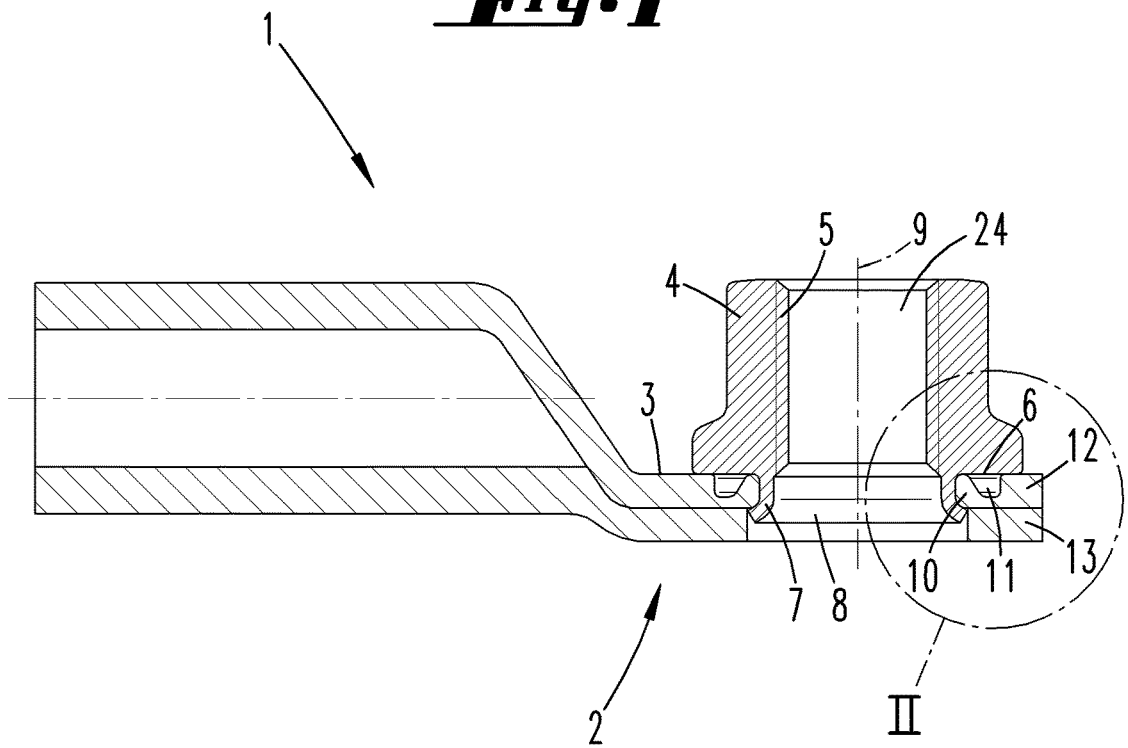
FIG. 1 shows a first embodiment of a nut that is connected to a cable shoe.

A cable shoe 1 with a flat part connecting section 2 is initially described with reference to FIGS. 1 and 2. A nut 4 is seated on the top side 3 of the flat part connecting section 2. The nut 4 conventionally contains a screw opening 24 with an internal thread 5. The nut 4 is seated on the top side 3 by means of the seating face 6. A holder section 7 extends further downward from the seating face 6 and may be realized cylindrically in the initial state as illustrated, e.g., in FIG. 6f. The holder section 6 preferably is realized integrally with the nut 4 and made of the same material.

The flat part connecting section 2 furthermore contains a passage opening 8 that has a geometric center axis 9.

Figure 2:
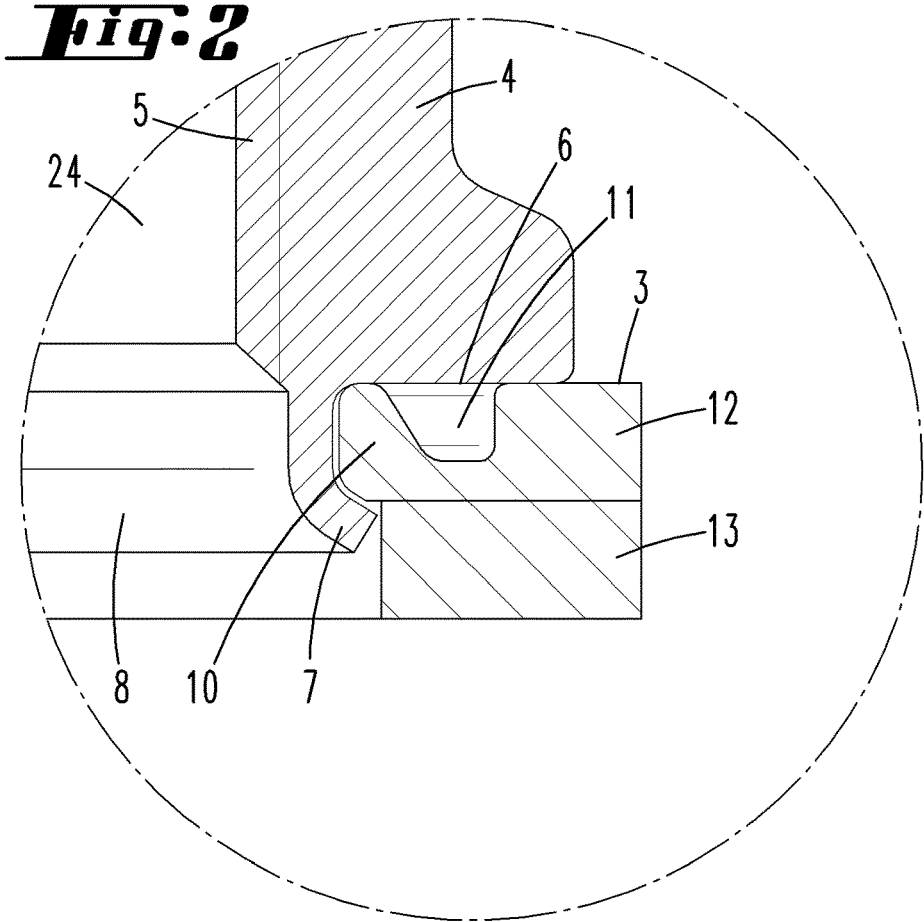
FIG. 2 shows the enlarged detail II-II of FIG. 1.

FIG. 2 particularly shows that a holder material section 10 protruding into the passage opening 8 is formed on the flat part connecting section 2 and encompassed by the holder section 7, which is widened by plastic deformation on its free end.

A recess 11 is furthermore produced in the flat part connecting section 2 starting from the top side 3. This recess 11 has led to the formation of the holder material section 10.

According to the embodiment in FIGS. 1 and 2, as well as all other embodiments described herein, the nut is therefore held on the cable shoe 1 in a form-fitting but freely rotatable manner. A certain axial play, which advantageously allows the free rotatability, preferably remains between the holder material section 10 and the holder section 7, which cross-sectionally encompasses this holder material section.

Figure 3:
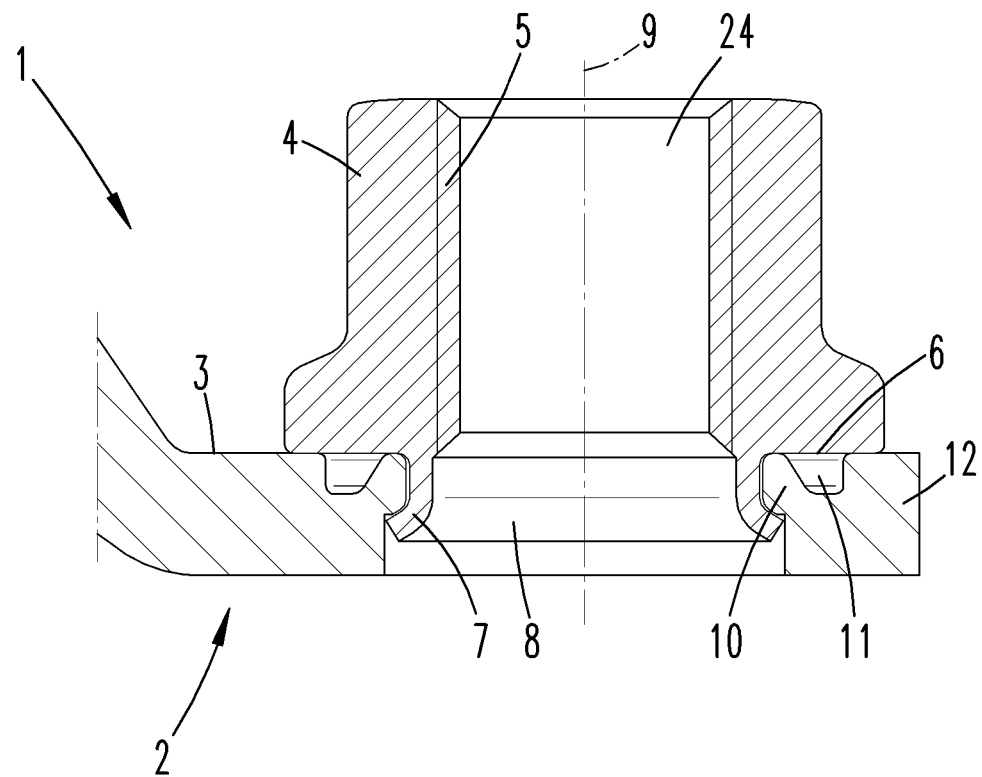
FIG. 3 shows another embodiment, in which the cable shoe is made of solid material, in the form of an illustration according to FIG. 1.

The embodiment in FIG. 3 corresponds to the embodiment in FIGS. 1 and 2. Identical components and regions accordingly are identified by the same reference symbols.

The only difference can be seen in that the flat part connecting section 2 is made of solid material. Accordingly, there are no folded sections that form two layers 12, 13 in a cross section.

Figure 4:
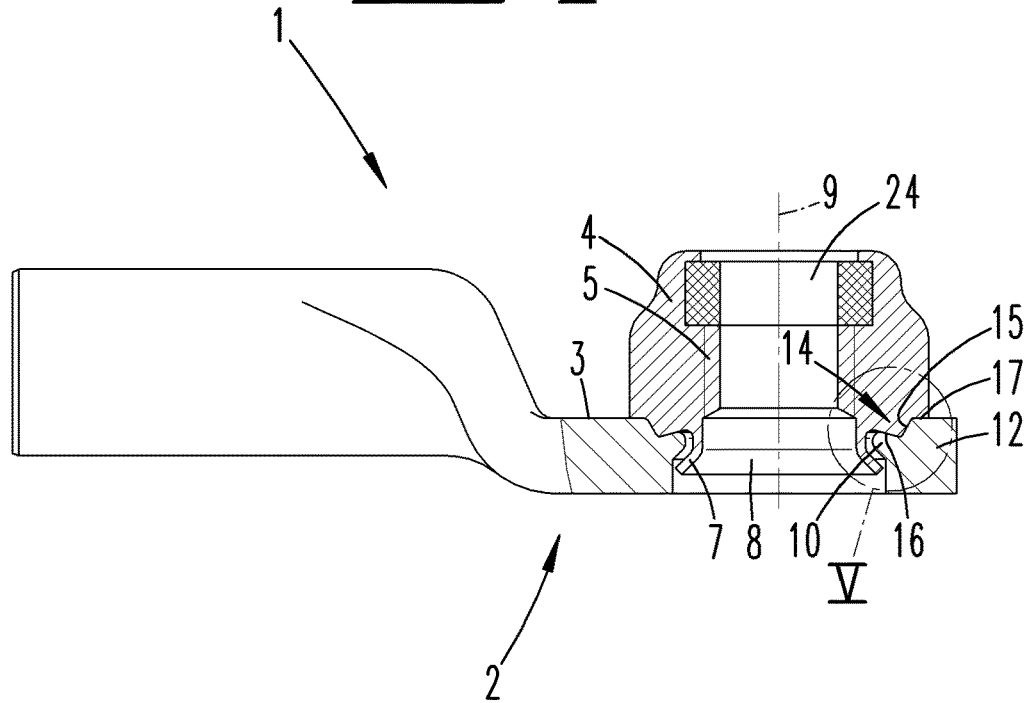
FIG. 4 shows another embodiment according to FIG. 1 or FIG. 3 with a nut, which has a recessing formation on the seating face.
Figure 5:
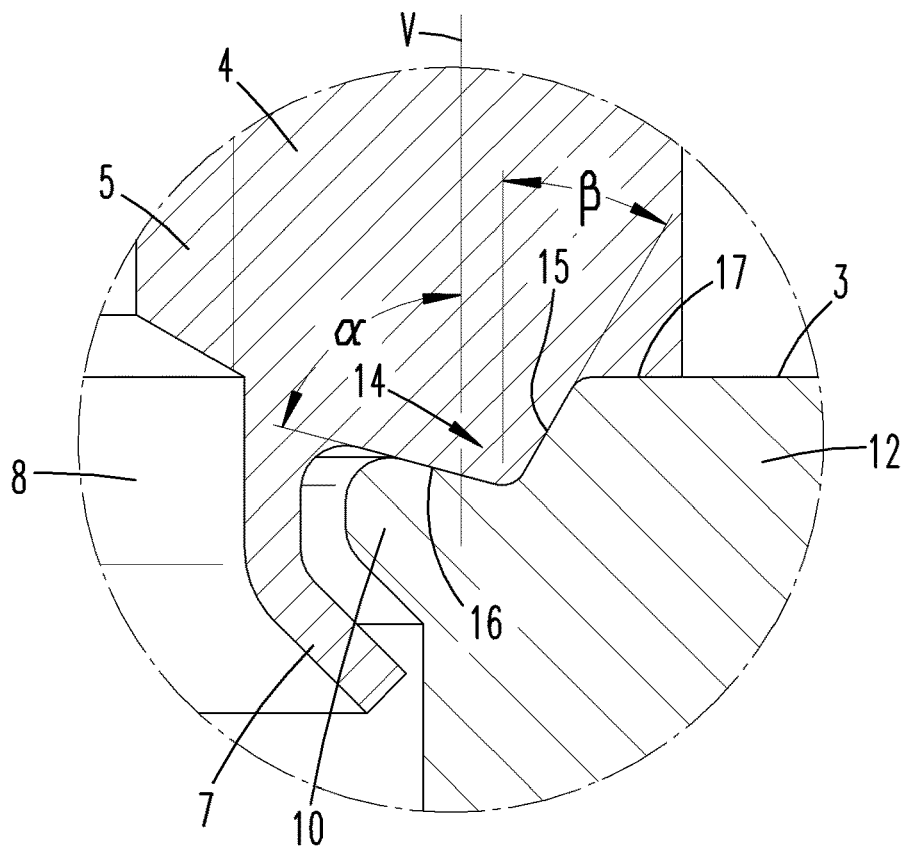
FIG. 5 shows the enlarged detail V-V of FIG. 4.

In the embodiment in FIGS. 4 and 5, the nut 4 is directly realized with a recessing projection 14 on the seating face 6 thereof.

This recessing projection 14 particularly may consist of a vertical face 15, which preferably includes an acute angle β with the vertical line. A peripheral face 16 may furthermore be formed so as to likewise include an acute angle α with a vertical line V. The design can also be described in such a way that both faces include an acute angle with a horizontal line, which is not illustrated in greater detail.

The acute angles α and β preferably lie in the range of 1-60°. It is furthermore preferred that the angle α lies between 10° and 30° and the angle β lies between 20° and 50°. In the exemplary embodiment, the angle α amounts to 15° and the angle β amounts to 30°.

On its radially outer side, the vertical face 15 transforms into a horizontal face 17 that, if applicable, may have a different radial extent over the circumference in a hexagonal design of the nut.

In this embodiment, the described faces 15-17 jointly form the seating face of the nut 4. In a concentric alignment between the nut 4 and the passage opening 8, the seating face extends radially inward until it overlaps with the edge of the passage opening 8, particularly referred to the edge that remains unaffected by a deformation process.

As a result of the described angular design of the peripheral face 16 and the vertical face 15, a resilience of the material of the flat part connecting section 2 can occur when the nut 4 is correspondingly pressed into the top side of the flat part connecting section 2, wherein said resilience in any case causes the horizontal face 17 to be slightly raised above the top side 3 of the flat part connecting section 2. The desired easy rotatability can also be advantageously affected in this way.

In contrast to the embodiment in FIGS. 1-3, the holder material section 10 in the embodiment in FIGS. 4 and 5 is normally shifted further downward into the passage opening 8 in the flat part connecting section 2.

An example of the production of a nut, which is rotationally connected to a flat part connecting section of a cable shoe, is described in greater detail below with reference to FIG. 6.

A tube section 18 may be used as base product for the cable shoe 1. The tube section 18 is pressed into a flat shape on one side in order to form the flat part connecting section 2; see FIG. 6b.

The passage opening 8 can be produced in the next step; see FIG. 6c. This may be realized, for example, by means of a punching process. In an alternative embodiment illustrated in FIG. 6c', the recess 11 can be produced simultaneously with the production of the passage opening 8, which is preferably realized by means of a punching process. This figure also shows an example of a combined recessing and punching tool 25, which can be used for this purpose. In this case, the production of the passage opening 8 and the production of the recess 11 are carried out in an integrated manner.

Figure 6:
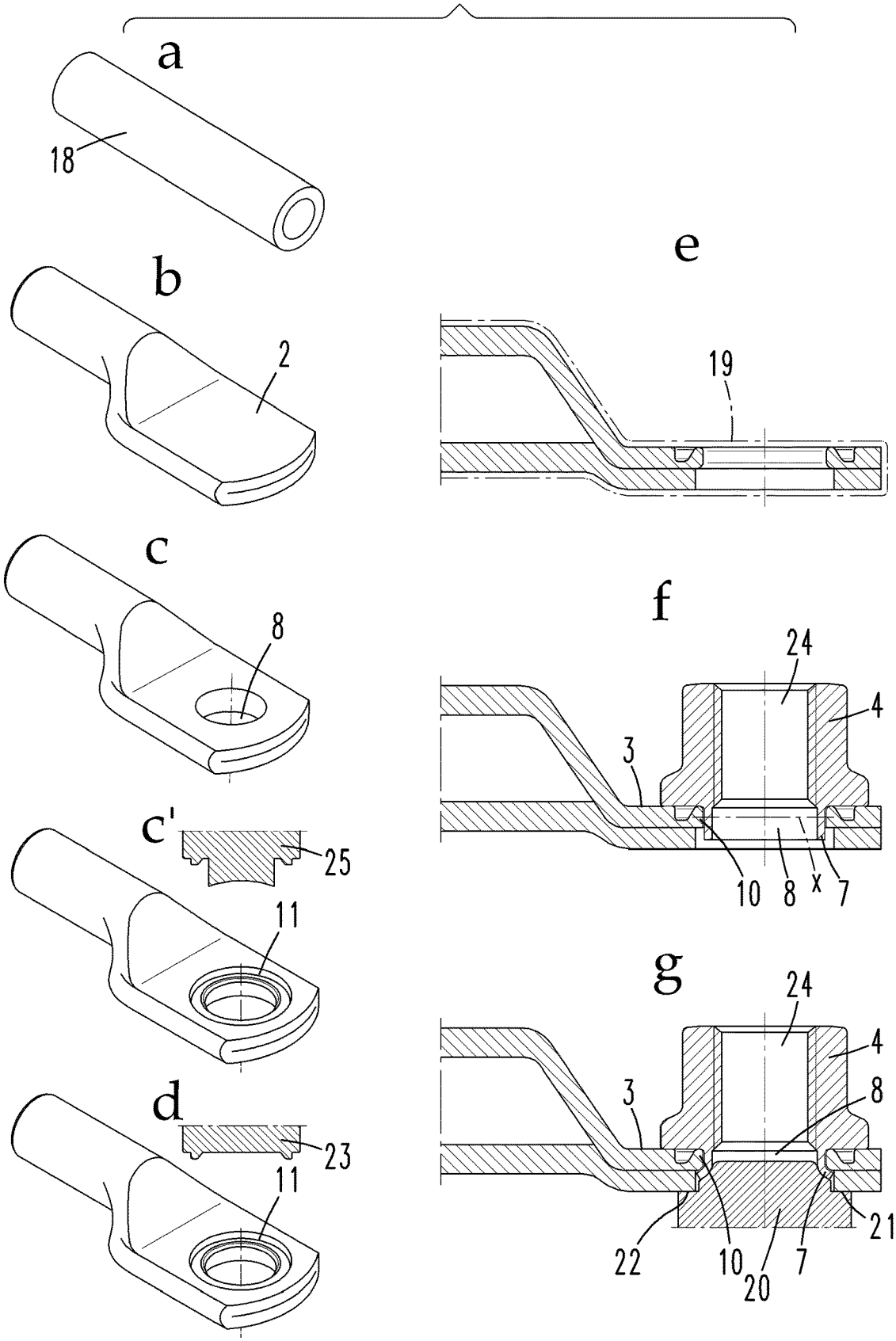
FIG. 6 shows an exemplary illustration of the production of the cable shoe according to FIG. 1, which is connected to a nut.

If the production of the passage opening 8 and the production of the recess 11 are not carried out in an integrated manner, the recess 11, which in the exemplary embodiment illustrated in FIG. 6 consists of a circumferential groove, is produced in another optional production step; see FIG. 6d. This figure furthermore shows a die tool 23, which can be optionally used for producing the recess 11.

In another production step that is indicated in FIG. 6e, the thusly prepared cable shoe can be subjected to a surface treatment, e.g. for applying a surface coating, particularly an anti-corrosion coating 19.

The nut 4 is attached to the top side 3 of the thusly produced cable shoe in the next production step; see FIG. 6f. In this case, the holder section 7 is still undeformed and protrudes downward into the passage opening 8 beyond a narrowest cross section x of the holder material section 10.

The holder section 7 is widened by means of a mandrel 20 in the next production step; see FIG. 6g. In order to limit the advance of the mandrel 20, a flatly designed top side 21 thereof can come in contact with the associated bottom side 22 of the flat part connecting section 2.

LIST OF REFERENCE SYMBOLS

1 Cable shoe
2 Flat part connecting section

3 Top side
4 Nut
5 Internal thread
6 Seating face
7 Holder section
8 Passage opening
9 Center axis
10 Holder material section
11 Recess
12 Layer
13 Layer
14 Recessing projection
15 Vertical face
16 Peripheral face
17 Horizontal face
18 Tube section
19 Anti-corrosion coating
20 Mandrel
21 Top side
22 Bottom side
23 Die tool
24 Screw opening
25 Combined recessing and punching tool
α Angle
β Angle
V Vertical line
x Cross section

The invention claimed is:

1. A method for connecting a nut to a flat part connecting section of a cable shoe comprising:
   providing the nut having a seating face at a bottom thereof, and a holder section extending downward from the seating face;
   providing the flat part connecting section;
   forming a passage opening in the flat part connecting section;
   forming a recess around the passage opening in a top side of the flat part connecting section, thereby deforming a holder material section of the flat part connecting section to form a tapered portion of the passage opening which curves into the passage opening, the holder material section forming a narrowest cross section of the passage opening;
   inserting the nut into the passage opening through the top side of the flat part connecting section with the holder section of the nut protruding downward beyond the holder material section; and
   widening the holder section of the nut underneath the holder material section, thereby holding the nut on the flat part connecting section in a freely rotatable and interlocking manner.

2. The method according to claim 1, further comprising surface treating the flat part connecting section before attaching the nut to the flat part connecting section.

3. The method according to claim 1, wherein the forming of the passage opening in the flat part connecting section and the forming of the recess are done at the same time.

4. The method according to claim 1, wherein the forming of the passage opening in the flat part connecting section is done prior to the forming of the recess.

5. The method according to claim 1, wherein the holder section of the nut is widened by plastic deformation.

6. A combination comprising:
   a nut comprising a seating face at a bottom thereof, the seating face extending linearly from an opening through the nut, and a holder section extending downward from the seating face; and
   a flat part connecting section of a cable shoe, the flat part connecting section comprising a bottom side and a linearly extending top side, a passage opening extending between the top side and the bottom side, a recess extending downward from the top side, the recess surrounding the passage opening and being spaced outwardly from the passage opening, and a holder material section forming a tapered portion of the passage opening which is curves into the passage opening and forms a narrowest cross section of the passage opening,
   wherein the seating face of the nut is seated on the top side of the flat part connecting section and covers the recess but does not enter into the recess, and the holder section protrudes downward beyond the holder material section and extends underneath the holder section, such that the nut is held on the flat part connecting section in a freely rotatable and interlocking manner.

7. The nut according to claim 6, wherein the recess a circumferential groove.

* * * * *

UNITED STATES PATENT AND TRADEMARK OFFICE
CERTIFICATE OF CORRECTION

Page 1 of 1

PATENT NO.         : 10,790,598 B2
APPLICATION NO.    : 16/339349
DATED              : September 29, 2020
INVENTOR(S)        : Bernd Bürger It is certified that error appears in the above-identified patent and that said Letters Patent is hereby corrected as shown below:

In the Claims

In Claim 6, in Column 8, Line 32:
Delete "which is curves" and
Insert -- which curves --.

Signed and Sealed this
Twenty-ninth Day of December, 2020

Andrei Iancu
*Director of the United States Patent and Trademark Office*